United States Patent [19]

Bruno

[11] 4,355,712

[45] Oct. 26, 1982

[54] APPARATUS FOR FEEDING PRODUCTS TO A WORK STATION

[75] Inventor: Carlo L. Bruno, Oundle, England

[73] Assignee: Alisyncro S.a.s. di Bruno & C., Turin, Italy

[21] Appl. No.: 128,598

[22] Filed: Mar. 10, 1980

[30] Foreign Application Priority Data

Mar. 29, 1979 [IT] Italy ............................ 67656 A/79

[51] Int. Cl.³ ............................................ B65G 47/26
[52] U.S. Cl. .................................................. 198/460
[58] Field of Search ............... 198/460, 572, 575, 577, 198/461, 491

[56] References Cited

U.S. PATENT DOCUMENTS

| | | | |
|---|---|---|---|
| 3,952,859 | 4/1976 | Holt et al. | 198/461 |
| 4,008,796 | 2/1977 | Aylon | 198/460 |
| 4,190,146 | 2/1980 | Kuchel | 198/460 |
| 4,195,723 | 4/1980 | Loewenthal | 198/461 |

FOREIGN PATENT DOCUMENTS 2346407 3/1974 Fed. Rep. of Germany ...... 198/460

Primary Examiner—Joseph E. Valenza
Attorney, Agent, or Firm—Sughrue, Mion, Zinn, Macpeak and Seas

[57] ABSTRACT

The apparatus feeds products in mutually spaced relation to a work station such that successive products are received thereby at substantially the same point of successive working cycles. The apparatus comprises a first conveyor arranged to receive a longitudinal row of products in which adjacent products are touching, and a second conveyor receiving products from the first conveyor and driven at a speed greater than that of the first conveyor. A plurality of photocell devices sense the position of products on the second conveyor relative to their theoretical desired positions appropriate to cause the products to be successively fed to the work station at the desired point of successive working cycles. Upon the difference between the actual and theoretical desired positions of the products on the second conveyor exceeding a predetermined value, the speed of the first conveyor is appropriately adjusted.

6 Claims, 3 Drawing Figures

APPARATUS FOR FEEDING PRODUCTS TO A WORK STATION

The present invention relates to apparatus for feeding products in mutually spaced relation to a work station such that successive products are received thereby at substantially the same point of successive working cycles of the work station, the apparatus being of the type provided with a first conveyor on which said products are received to form a longitudinal row in which adjacent products are touching. In particular, but not exclusively, the invention relates to such apparatus arranged to feed confectionery products to a packing machine.

Apparatus of the aforesaid type is described in published British patent application no. 2,001,029 dated 12, 7, 1978, U.S. Pat. No. 3,452,856, and German Pat. Nos. DOS 2,346,407 and DAS 1,288,509.

In some known forms of the aforesaid type of apparatus it has been found that the separation of each product from the adjacent downstream product of the longitudinal product row, does not always occur in a clear cut manner, as is desirable for correct operation of the apparatus. This problem is attributable to the fact that, during separation of two adjacent products, these products rub against each other by their facing ends, as a result of which friction effects and other influences may exert an unpredictable but significant effect on the separation process; in the case of confectionery products, the presence of sticky dribbles or the generally sticky nature of the product may make the separation process particularly difficult.

It is therefore an object of the present invention to provide apparatus of the above-specified type which facilitates good product separation and operates to prevent the feeding of products to a work station out of synchronism with its working cycle.

Accordingly, the present invention provides product feed apparatus of the aforesaid type wherein in addition to the first conveyor, the apparatus further comprises:

a second conveyor aligned with the first conveyor and having a loading end located adjacent the discharge end of the first conveyor, the second conveyor being arranged to feed products received from said first conveyor to said work station, first drive means selectively operable to advance the first conveyor at a first speed $V_1$ or at a second speed $V_2$, greater than the first speed $V_1$, second drive means operable to advance the second conveyor at a speed $V_3$ defined by the expression:

$$V_3 = V_M P_T / L$$

where:

$V_M$ is the mean value between the said first and second speeds $V_1$, $V_2$ of the first conveyor, L is the length of a said product, and $P_T$ is the value of the spacing between products when located on said second conveyor at theoretical desired positions appropriate to cause the products to be successively fed to the working station at the same desired point of successive working cycles, a first sensor unit and a second sensor unit each arranged to detect the presence of a product at respective locations along the second conveyor, the first sensor unit being positioned upstream of the second sensor unit and said locations being spaced from each other by a distance D defined by the expression:

$$D = L + 2(\Delta p/2)$$

where $\Delta p/2$ is equal to the maximum permissible offset between the actual position of a product on the second conveyor and its theoretical desired position thereon; and control means operative to sample said sensor units at a frequency dependent on the speed of the second conveyor with each successive sampling taking place at the moment at which each successive product would, if in its said theoretical desired position on the second conveyor, be disposed midway between the two sensor units, the said control means being arranged to control said first drive means to advance the first conveyor at its first speed $V_1$ when the second sensor unit detects the presence of a product at a said moment of sampling and to advance the said first conveyor at its second speed $V_2$ when the first sensor unit detects the presence of a product at a said sampling moment.

Apparatus, embodying the invention, and for feeding products to a packing machine will now be particularly described, by way of example, with reference to the accompanying diagrammatic drawings, in which.

Figure 1:
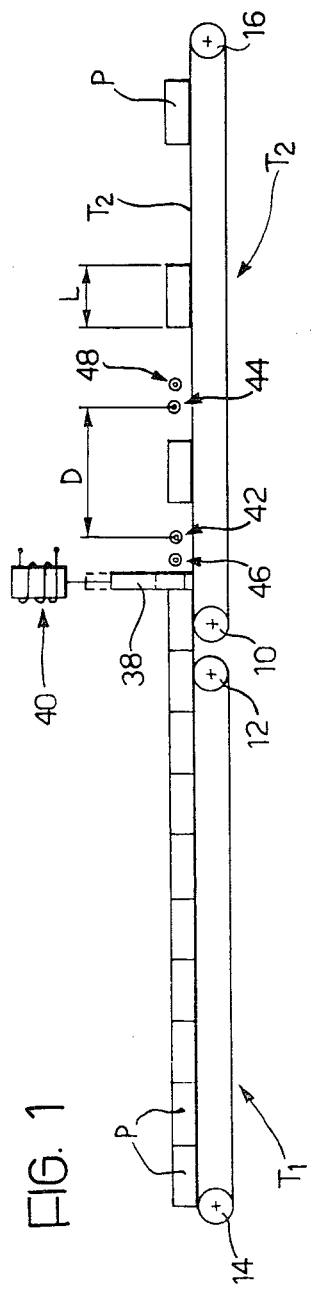
FIG. 1 shows the part of the apparatus in side elevation.
Figure 2:
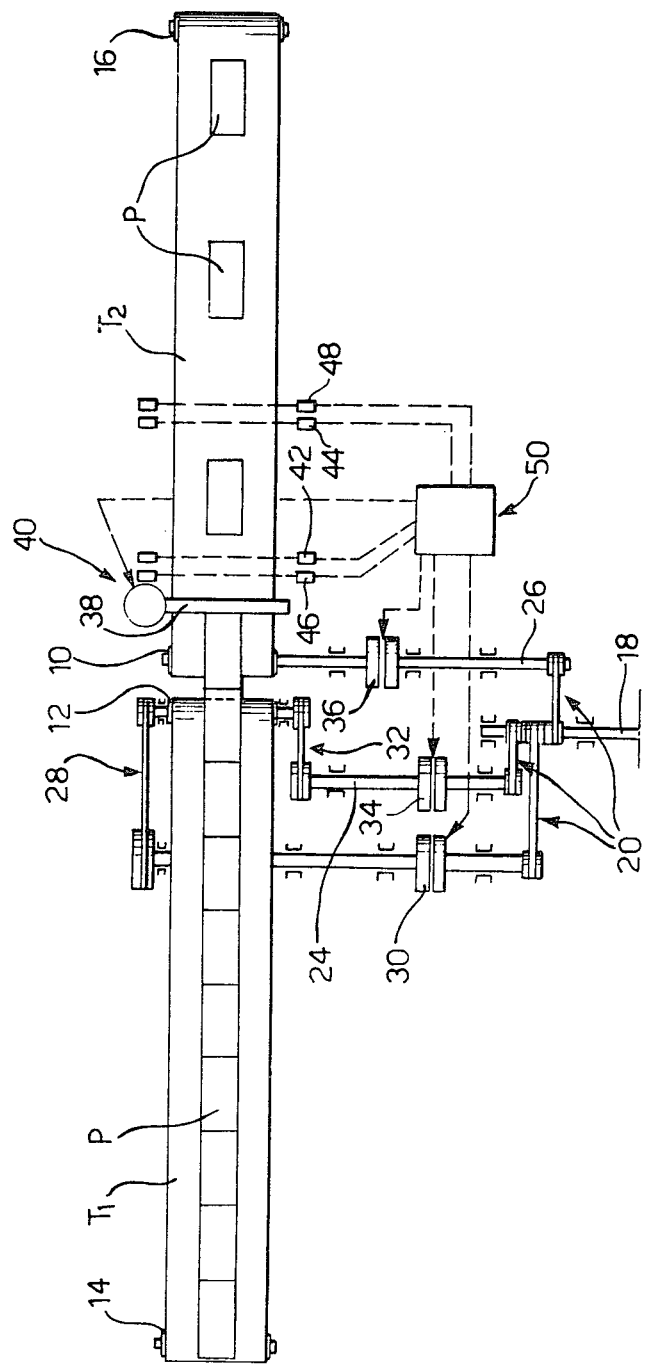
FIG. 2 is a plan view of the apparatus.

The apparatus shown in FIGS. 1 and 2, comprises two linear belt-conveyors $T_1$ and $T_2$ arranged in alignment with each other with the discharge end of the conveyor $T_1$ juxtaposed the loading end of the conveyor $T_2$. The belt of the conveyor $T_1$ passes around rollers 14 and 12 respectively arranged at the loading and discharge ends of the conveyor $T_1$. Similarly, the belt of the conveyor $T_2$ passes around rollers 10 and 16 respectively arranged at the loading and discharge ends of the conveyor $T_2$.

The conveyor $T_1$ is arranged to receive at its loading end a longitudinal row of products P coming from a production unit, adjacent products P being in contact with each other.

The conveyor $T_2$ feeds the products P spaced from each other longitudinally of the conveyor, to a packing machine (not shown). This packing machine is provided with a chain conveyor which requires the products to be fed thereto at the same point in respective packing machine cycles. The positions of the products on the moving upper pass of the conveyor $T_2$ which correspond to the correct feeding of the products to the packing machine will be hereinafter termed the theoretical desired positions of the products. When products are located on the second conveyor $T_2$ at said theoretical desired positions, they are spaced from each other by a distance $P_T$. It will be appreciated that if a product transferred onto the conveyor $T_2$ is offset from its desired position, then even though the next product may be transferred to the conveyor $T_2$ at said distance $P_T$ from the preceding product, this next product will also be displaced from its desired position.

By arranging for the speed of the conveyor $T_2$ to be proportional to the machine cycle rate, the value of the distance $P_T$ can be made independent of the machine cycle rate. To this end, an input drive shaft 18 of the apparatus is driven in rotation from the packing machine. This drive shaft 18 is coupled through belt drives 20 to three parallel transmission shafts 22, 24 and 26.

The shaft 22 is arranged to rotatably drive the downstream roller 12 of the conveyor $T_1$ through a belt transmission 28. A selectively-engageable coupling 30 is operatively interposed intermediate the ends of the shaft 22 and, when engaged, allows the transmission of drive along the shaft 22 to the roller 12 whereby to cause the conveyor $T_1$ to move at a speed $V_1$. The shaft 24 is arranged to transmit the rotation of the drive shaft 18 to the roller 12 through a belt transmission 32 which has a transmission ratio greater than that of the transmission 28. A selectively-engageable coupling 34 is operatively interposed in the shaft 24 intermediate its ends and, when engaged, allows the transmission of the drive along the shaft 24 from the shaft 18 to the roller 12 whereby to cause the conveyor $T_1$ to advance at a speed $V_2$ which is greater than the speed $V_1$. The shaft 26 is arranged to rotatably drive the upstream roller 10 of the conveyor $T_2$ so that this conveyor advances at a speed $V_3$ which is greater than the average of the said speeds $V_1$ and $V_2$ of the conveyor $T_1$ and which is defined by the expression:

$$V_3 = V_M P_T / L$$

where:

$V_M$ is the mean value between the speeds $V_1$ and $V_2$ of the conveyor $T_1$;

L is the length of a said product P, and $P_T$ is the value of the spacing between products located in their theoretical desired positions along the conveyor $T_2$.

A selectively-engageable coupling 36 is operatively interposed intermediate the ends of the shaft 26 to enable the control of drive transmission therealong.

Above the upstream end portion of the conveyor $T_2$ is arranged a crosspiece 38 which extends across the entire width of the conveyor and which can be moved, by means of an electromagnet 40, between a raised position and a lowered position, indicated respectively by a broken line and a full line in FIG. 1. In its raised position, the crosspiece 38 allows the passage of the products P onto and along the conveyor $T_2$. In the lowered position of the crosspiece 38, a product P fed to the loading end of the conveyor $T_2$ will be halted by abutment with the wall of the crosspiece facing the conveyor $T_1$ (hereinafter referred to as the front wall of the crosspiece 38).

The front wall of the crosspiece 38 is spaced from the loading end of the conveyor $T_2$ by a distance set such that the plane of contact between the product P halted by abutment with the crosspiece 38 and the product P next upstream, is equidistant from the axes of the rollers 10 and 12. Downstream of the crosspiece 38 are arranged two photo-electric sensor units comprising respective photo-cells 42 and 44, and means for generating and directing respective light beams across the upper working pass of the conveyor $T_2$ onto corresponding ones of the photocells 42, 44. These light beams are so arranged that as a product P passes along the conveyor $T_2$ the beams of the two photo-electric sensor units will be successively interrupted. The photocells 42 and 44 are spaced from each other by a distance D defined by the expression:

$$D = L + 2(\Delta p/2)$$

where $\Delta p/2$ is equal to the maximum permissible value of offset of the position of a product on the conveyor $T_2$ from its theoretical desired position. Two other photo-electric sensor units are provided with the photocells 46 and 48 of these units being respectively located upstream of the photocell 42 and downstream of the photocell 44. The photocells 42, 44, 46 and 48 are connected to an electrical control system 50 of the apparatus. The control system 50 is arranged to control the electromagnet 40 and the couplings 30, 34, and 36 in dependence on the output signals received from the photocells 42, 44, 46 and 48.

In FIG. 1, the apparatus is shown halted, the crosspiece 38 being in its lowered position with the first product P of the row of products on the conveyor $T_1$ resting against the front wall of this crosspiece. Upon activation of the apparatus, the control system 50 controls the raising of the crosspiece 38 and starting of the conveyor $T_2$ and of the conveyor $T_1$ such that clear-cut separation occurs between the first product P of the row and the product immediately following. This separation is facilitated by the fact that the plane of separation between the two products is located between the ends of the two conveyors $T_1$ and $T_2$.

Ideally, during operation of the apparatus the products P on the conveyor $T_2$ would be positioned in their theoretical desired positions and be spaced by the distance $P_T$. To monitor the actual positions of the products relative to their theoretical desired positions, the control system 50 is arranged to sample the outputs of the photocells 42 and 44 at the moment at which a product P should theoretically be midway between the photocells 42 and 44. This sampling of the photocells 42 and 44 is effected at a frequency which is dependent on the speed of advance $V_3$ of the second conveyor $T_2$ and which is set such that with the products P in their theoretical desired positions, at each successive sampling a product P is positioned midway between the photocells 42 and 44. In practice it may happen that at each sampling the products P are displaced with respect to their theoretical position. The maximum value $\Delta p/2$ of the deviation allowed between the actual position and the theoretical position of each product P on the conveyor $T_2$ is proportional to:

(a) the speed $V_3$ of the conveyor $T_2$, in that in ideal conditions there exists a direct proportionality between the speed $V_3$ of the conveyor $T_2$ and the spacing between the products conveyed by the conveyor $T_2$;

(b) the permitted tolerance on the length L of the product; and (c) the permitted deviation between the desired and actual points in the packing machine cycle when a product is fed thereto from the conveyor $T_2$.

If at the moment of sampling of the photocells 42 and 44, the beam directed onto one of these photocells is interrupted by one of the products P, this indicates that the products P have shifted with respect to their theoretical desired positions by an amount greater than the admissible value expressed by the value $\Delta p/2$. In this situation, the control system 50 is arranged to control the couplings 30 and 34 to appropriately adjust the speed of the conveyor $T_1$. Thus, if at the moment of sampling, one of the products P interrupts the beam directed onto the photocell 44, the control system 50 engages the coupling 30 and disengages the coupling 34 so that the conveyor $T_1$ slows down from the speed $V_2$ to the speed $V_1$; as a result, at each successive sampling, the position of the product which at that moment would ideally be midway between the photocells 42 and 44, shifts progressively upsteam from the photocell 44 towards the midway position.

Similarly if at the moment of sampling, one of the products P interrupts the beam directed onto the photocell 42, the control system 50 will engage the coupling 34 and disengage the coupling 30 so that the speed of the conveyor $T_1$ increases from $V_1$ to $V_2$; this time at each successive sampling the products will be positioned progressively further downstream of the photocell 42 and thus nearer their theoretical desired position.

The values of the speeds $V_1$ and $V_2$ are selected on the basis that the differences between each of the speeds $V_1$ and $V_2$ and the speed $V_M$ (equal to the mean value between $V_1$ and $V_2$) is inversely proportional to the interval of time comprised between the moment at which one of the photocells 42, 44 detects the presence of a product P and the moment at which the products P are again located in their theoretical desired positions. Thus the shorter it is desired to make this interval the greater will be the difference between $V_1$ ($V_2$) and the average speed $V_M$. However, it should be noted that above a certain value of this difference, the opposite effect to that desired is achieved when the speed of the conveyor $T_1$ is changed; in this case each successive product instead of being approached nearer and nearer to its theoretical desired position, is shifted away from this position in the direction opposite that in which the product which causing the speed change was situated.

Should changing the speed of the conveyor $T_1$ be ineffective to improve or at least hold steady the position of each successive product relative to their theoretical desired positions, then in due course a product will be transferred onto the conveyor $T_2$ in a position offset from its theoretical desired position by a value greater than the admissible value $\Delta p/2$. As a result, one of the photocells 46 and 48, (whose outputs are sampled by the control system 50 at the same moment as the photocells 42 and 44) will be interrupted by this product at the moment of sampling. The control system 50 is arranged to respond to such an occurrence by immediately halting the apparatus since the offending product would not be accepted by the packing machine. Before the apparatus is restarted an operator readjusts the position of the offending product to its theoretical desired position.

At the end of a working period of the apparatus, the control system 50 is arranged to stop the two conveyors $T_1$ and $T_2$ and, at the same time, lower the crosspiece 38 to halt the leading product of the row on the conveyor $T_1$ in the correct position required for subsequent restarting of the apparatus.

Figure 3:
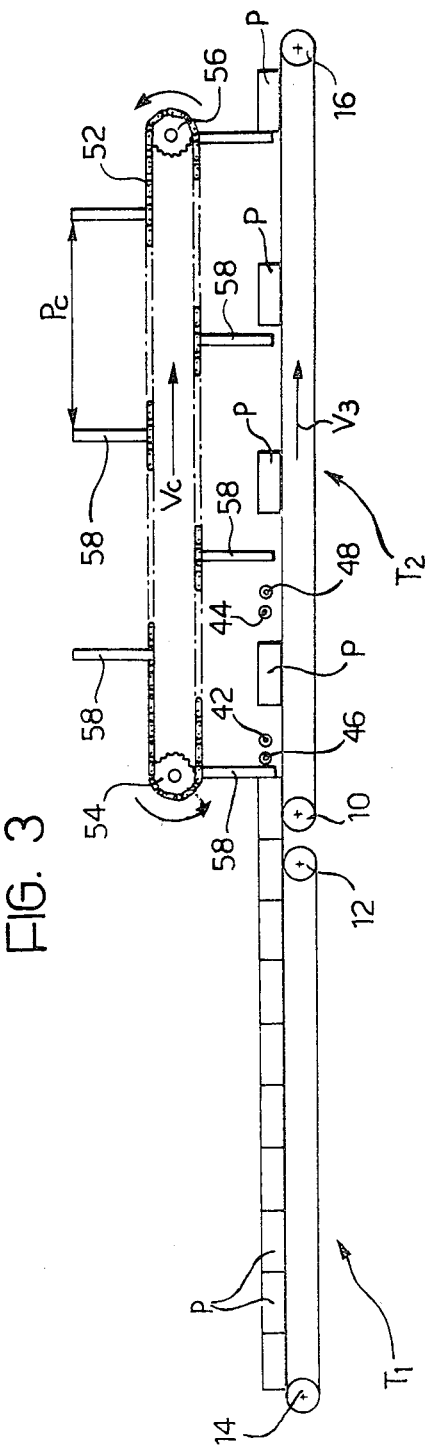
FIG. 3 is a view similar to FIG. 1 but showing a modified form of the apparatus.

In the modified form of the apparatus shown in FIG. 3, component elements of the apparatus similar to those of the embodiment of FIGS. 1 and 2 are indicated by the same reference numerals. In the FIG. 3 apparatus a closed-loop chain 52 is positioned above and parallel to the conveyor $T_2$. The chain 52 passes around two end toothed wheels 54 and 56, one of which is driven from the conveyor $T_2$. The chain 52 is provided with plates 58 which as they travel along the lower pass of the closed-loop chain 52 depend therefrom towards the upper working pass of the conveyor $T_2$. The plates 58 are spaced from each other along the chain 52 by a predetermined distance $P_C$ greater in value than the distance between the photocells 46 and 48. The chain 52 is arranged to advance in a continuous manner at a speed $V_c$ which is defined by the expression:

$$V_c = \frac{nP_C}{np_c - \frac{P_c}{2} + \frac{L}{2} - \frac{\Delta p}{2}} V_3$$

where n is a positive integer. By the quantity $np_c$ is understood the distance which separates, at the moment of sampling the photocells 42–48, the plate 58 immediately above the photocell 46 and the plate 58 which is in contact with one of the products P. In the example of FIG. 3, this distance corresponds to $3p_c$ that is n=3. Due to the above relationship between the speeds $V_3$ and $V_c$, as each plate 58 moves along the lower pass of the closed-loop chain 52, it gradually catches up a respective one of the products P on the conveyor $T_2$ until over the final section of the lower pass of the chain 52 it pushes this product P along the conveyor $T_2$ towards the discharge end of the conveyor $T_2$. The FIG. 3 apparatus thus provides a constant spacing between the products P as they leave the conveyor $T_2$, nullifying any offset between the actual and theoretical desired positions of a product (provided this offset is within the maximum permissible value $\Delta p/2$). The photocells 46 and 48 are connected to an electrical control system 50 similar to that already described, and control the halting of the apparatus in cases where the plates 58 might become damaged, that is, in cases where the products P exceed the maximum admissible value of deviation from their theoretical desired positions.

In the FIG. 3 apparatus the blocking function, which in the preceding embodiment was fulfilled by the cross piece 38, is now performed by one of the plates 58 of the chain 52. To this end, at the finish of a working period of the apparatus the electrical control system 50 is arranged to stop the chain 52 in the position shown in FIG. 3, in which the leading product P on the conveyor $T_1$ abuts against one of the plates 58. This plate 58 is halted at such a distance from the loading end of the conveyor $T_2$ that the plane of contact between the leading product which rests against the plate and the product next upstream is equidistant from the axis of the return rollers 10 and 12. The leading product P of the product row on the conveyor $T_1$ is thus ideally positioned for the re-starting of the apparatus. The control system 50 is arranged to control the re-starting of the conveyor $T_2$ and the chain 52 such that the plate 58 blocking the leading product on the conveyor $T_1$ is moved out of contact therewith, whereby to ensure a clear-cut separation between the leading product of the row and the product next upstream.

Instead of effecting blocking of the leading product P using one of the plates 58, it would of course be possible to carry out this function using the crosspiece arrangement of FIGS. 1 and 2, the chain 52 being located downstream of the crosspiece 38 and serving only to ensure a proper positioning of the products P at the exit of the conveyor $T_2$.

I claim:

1. Apparatus for feeding products in mutually spaced relation to a work station such that successive products are received thereby at substantially the same point of successive working cycles of the work station, said apparatus comprising:

(a) a first conveyor on which said products are received to form a longitudinal row thereupon in which adjacent products are touching, (b) a second conveyor aligned with said first conveyor and having a loading end located adjacent a discharge end of said first conveyor, the second conveyor being arranged to feed products received from said first conveyor to said work station, (c) first drive means selectively operable to advance the first conveyor at a first speed $V_1$ or at a second speed $V_2$, greater than the first speed $V_1$, (d) second drive means operable to advance the second conveyor at a speed $V_3$ defined by the expression:

$$V_3 = V_M P_T / L$$

where:
$V_M$ is the mean value between the said first and second speeds $V_1$, $V_2$ of the first conveyor,
L is the length of a said product, and
$P_T$ is the value of the spacing between said products when located on said second conveyor at theoretical desired positions appropriate to cause the products to be successively fed to said working station at the same desired point of successive said working cycles thereof, (e) a first sensor unit and a second sensor unit each arranged to detect the presence of a product at respective locations along said second conveyor, the first said sensor unit being positioned upstream of the second sensor unit and said locations being spaced from each other by a distance D defined by the expression:

$$D = L + 2(\Delta p/2)$$

where $\Delta p/2$ is equal to the maximum permissible offset between the actual position of a product on the second conveyor and its said theoretical desired position thereon; and (f) control means operative to sample said sensor units at a frequency dependent on the speed of the second conveyor with each successive sampling taking place at the moment at which each successive product would, if in its said theoretical desired position on the second conveyor, be disposed midway between the two said sensor units, the said control means being arranged to control said first drive means to advance the first conveyor at its first speed $V_1$ when the second sensor unit detects the presence of a said product at a said moment of sampling and to advance the said first conveyor at its second speed $V_2$ when the first sensor unit detects the presence of a product at a said sampling moment.

2. Apparatus according to claim 1, further comprising blocking means operable to block the path of a said product being transferred onto the second conveyor whereby to halt that product in a position such that the plane of contact between this product and the product next upstream lies between the ends of the two said conveyors, said blocking means being controlled by said control means to effect its blocking function upon halting of the apparatus and to cancel this blocking function upon re-starting of the apparatus.

3. Apparatus according to claim 1, further comprising a closed-loop chain having an upper and a lower pass both arranged above and parallel to the second conveyor, two toothed wheels around which said chain is arranged to circulate, and third drive means drivingly connected to one said toothed wheel and operable to cause the chain to circulate around said wheels, the chain being provided with a plurality of elements spaced from each other along the chain by a distance $P_c$ which is greater than the distance D between the two said sensor units, each said element as it travels along the bottom pass of the closed-loop chain depending therefrom towards the upper working pass of the second conveyor, said third drive means being arranged to continuously advance the chain at a speed $V_C$ which is greater than the said second speed $V_3$ of the second conveyor and is defined by the expression:

$$V_C = \frac{np_C}{np_C - \frac{p_C}{2} + \frac{L}{2} - \frac{\Delta p}{2}} V_3$$

where n is a positive integer and $np_C$ represents the distance which at a said moment of sampling of the two sensor units, separates a said element which is located immediately above one of the two sensor units and a said element which is in contact with one of the products, each said element being operative in the final section of its course along the lower pass of the chain to push a respective product towards the discharge end of the second conveyor.

4. Apparatus according to claim 2, wherein said blocking means comprise a crosspiece extending across the upstream end of the second conveyor and vertically movable by an actuator between a raised position in which the said crosspiece allows the passage of products along the second conveyor, and a lowered position, in which said crosspiece is effective to block the path of a said product being transferred onto the second conveyor.

5. Apparatus according to claim 3 wherein upon stopping of the apparatus said control means is arranged to control said third drive means such that the chain is halted with one of its said elements in a position operative to block the path of a said product being transferred onto the second conveyor, said one element constituting blocking means whereby said product is halted in a position such that the plane of contact between said product and the product next upstream lies between the ends of the two said conveyors.

6. Apparatus according to claim 1, further comprising a third and a fourth sensor unit arranged respectively upstream and downstream of the said first and second sensor units, the control means being arranged to sample all said sensor units simultaneously and to stop the apparatus when either one of the third and fourth sensor units detects the presence of a product at its moment of sampling.

* * * * *